No. 760,906. PATENTED MAY 24, 1904.
A. F. MOTT.
COMB.
APPLICATION FILED JULY 23, 1903.
NO MODEL.
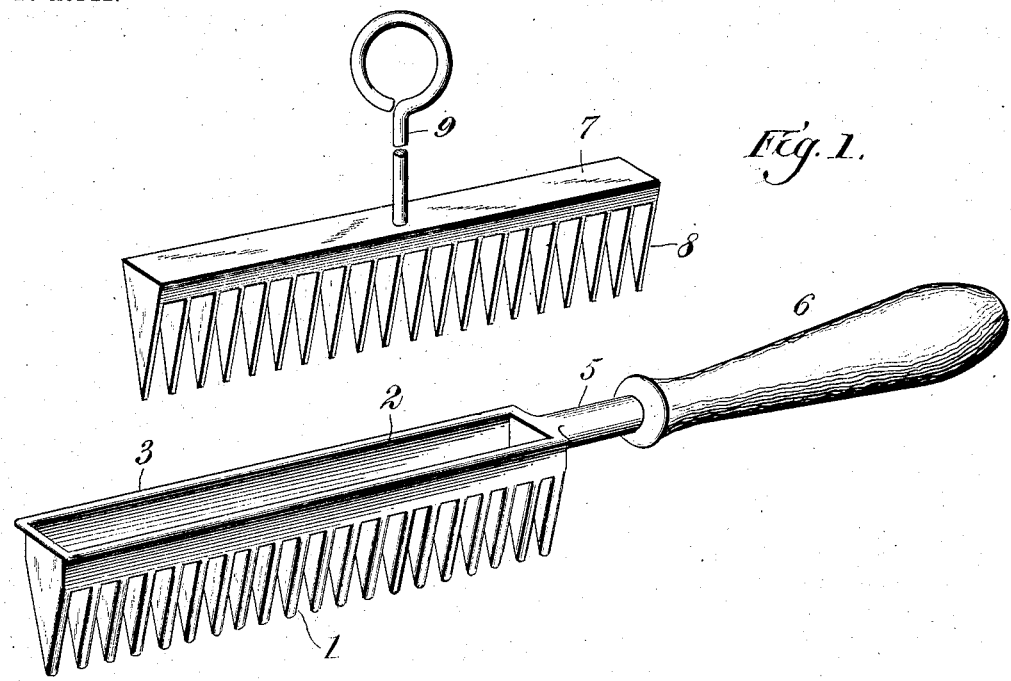
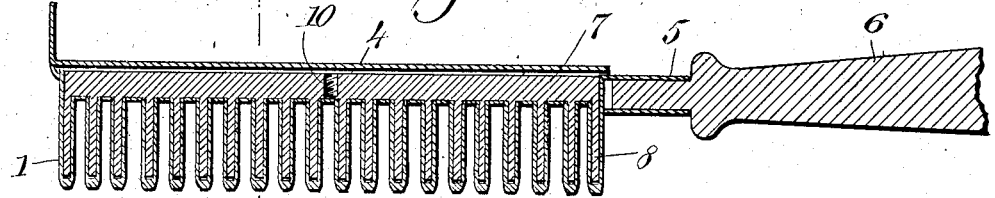
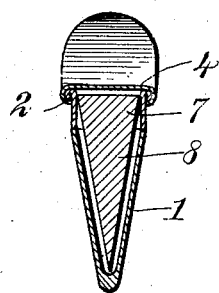
WITNESSES:
Paul Hunter
C. R. Ferguson
INVENTOR
Arthur F. Mott
BY
ATTORNEYS No. 760,906.

Patented May 24, 1904.

UNITED STATES PATENT OFFICE.

ARTHUR F. MOTT, OF NEW YORK, N. Y.

COMB.

SPECIFICATION forming part of Letters Patent No. 760,906, dated May 24, 1904.

Application filed July 23, 1903. Serial No. 166,701. (No model.)

*To all whom it may concern:*

Be it known that I, ARTHUR F. MOTT, a citizen of the United States, and a resident of the city of New York, borough of Brooklyn, in the county of Kings and State of New York, have invented a new and Improved Comb, of which the following is a full, clear, and exact description.

This invention relates to improvements in combs designed particularly for drying a person's hair after washing or shampooing, an object being to provide a comb by means of which the hair may be quickly dried without danger of burning or singeing.

I will describe a comb embodying my invention and then point out the novel features in the appended claims.

Reference is to be had to the accompanying drawings, forming a part of this specification, in which similar characters of reference indicate corresponding parts in all the figures.

Figure 1 is a perspective view of a comb and heating device embodying my invention. Fig. 2 is a longitudinal section thereof, and Fig. 3 is a section on the line $x$ $x$ of Fig. 2.

The comb comprises hollow teeth 1, extended from a box-like back 2, having flanges 3 on its opposite sides with which the inwardly-turned portions of a sliding cover 4 engage. On one end of the comb is a ferrule 5, with which the handle 6, of wood or other suitable non-conducting material, is attached.

The heating device consists of an iron or similar metal bar 7, having teeth 8, designed to be seated in the hollow teeth 1 of the comb, and as a means for inserting or removing the heating device I provide it with a removable handle 9. This handle 9 has a screw-threaded portion designed to engage in a tapped hole 10, formed in the bar 7.

In operation after heating the bar and its teeth 8 the same is to be inserted into the comb, as indicated in Fig. 2, and the cover placed thereon, and obviously the heat from the heating device will heat the teeth 1 sufficiently to dry the hair as the comb is passed through the same.

Having thus described my invention, I claim as new and desire to secure by Letters Patent—

1. A comb having hollow teeth and a box-like back portion, and a removable heater consisting of a bar also having teeth, said bar with its teeth being received into and entirely inclosed by said box-like back portion and the hollow teeth carried thereby.

2. A comb having hollow teeth, a handle for the comb, a removable heater comprising a bar having teeth designed to be seated in said hollow teeth, a cover for holding the heater in the comb and a handle removably connected to said heater.

3. A comb having hollow teeth and a box-like back, outwardly-extending flanges on the opposite sides of said back, a sliding cover adapted to overreach said flanges and engage the same to move longitudinally thereon, and a heater having projections adapted to be seated in said hollow teeth.

In testimony whereof I have signed my name to this specification in the presence of two subscribing witnesses.

ARTHUR F. MOTT.

Witnesses:
 SADIE A. MOTT,
 AUSTIN DUNN.